US012448835B2

(12) United States Patent
Choi et al.

(10) Patent No.: US 12,448,835 B2
(45) Date of Patent: Oct. 21, 2025

(54) FIREPROOF SHUTTER AND TRANSPORT APPARATUS INCLUDING THE SAME

(71) Applicant: SEMES CO., LTD., Cheonan-si (KR)

(72) Inventors: Jong Suk Choi, Hwaseong-si (KR); Sang Hui Lee, Andong-si (KR); Jung Un Kim, Busan (KR); Myeong Jin Bang, Seoul (KR); Sang Wook Kang, Cheonan-si (KR)

(73) Assignee: SEMES CO., LTD, Cheonan-si (KR)

( * ) Notice: Subject to any disclaimer, the term of this patent is extended or adjusted under 35 U.S.C. 154(b) by 555 days.

(21) Appl. No.: 17/550,248

(22) Filed: Dec. 14, 2021

(65) Prior Publication Data

US 2022/0186554 A1 Jun. 16, 2022

(30) Foreign Application Priority Data

Dec. 16, 2020 (KR) ........................ 10-2020-0176255

(51) Int. Cl.
*E06B 9/04* (2006.01)
*A62C 2/22* (2006.01)

(52) U.S. Cl.
CPC . *E06B 9/04* (2013.01); *A62C 2/22* (2013.01)

(58) Field of Classification Search
CPC ...... E06B 9/04; E06B 9/06; E06B 2009/2423; E06B 2009/2441; E06B 2009/2447; E06B 2009/2452; E06B 2009/2458; E06B 2009/405; E06B 9/42; E06B 9/56; E06B 9/58; E06B 5/16; E06B 3/509; E05F 17/00; E05F 15/622; E05D 15/38; E05D 15/36; A62C 2/22; A62C 2/18; A62C 2/065; A62C 2/06
USPC .......... 49/260, 261, 246, 247, 250, 252, 253
See application file for complete search history.

(56) References Cited

U.S. PATENT DOCUMENTS

| | | | | |
|---|---|---|---|---|
| 5,337,520 | A * | 8/1994 | Uribe | E05D 13/003 49/203 |
| 2010/0319258 | A1* | 12/2010 | Betker | E05D 15/38 49/199 |
| 2019/0063144 | A1* | 2/2019 | Jun | E06B 5/16 |

FOREIGN PATENT DOCUMENTS

| | | | | |
|---|---|---|---|---|
| CN | 104018765 | | 9/2014 | |
| CN | 107939253 | A * | 4/2018 | E02D 29/045 |
| CN | 110029921 | A * | 7/2019 | E05F 15/616 |
| CN | 209586117 | | 11/2019 | |
| CN | 209874881 | | 12/2019 | |
| CN | 112780166 | A * | 5/2021 | E05F 15/616 |
| CN | 113898408 | A * | 1/2022 | E05F 15/611 |
| JP | H7-303711 | | 11/1995 | |

(Continued)

OTHER PUBLICATIONS

Machine translation CN112780166 (Year: 2021).*

(Continued)

*Primary Examiner* — Daniel P Cahn
*Assistant Examiner* — Jeremy C Ramsey
(74) *Attorney, Agent, or Firm* — KILE PARK REED & HOUTTEMAN PLLC

(57) ABSTRACT

A fireproof shutter includes a frame having an opening through which a transport rail for movement of a transport vehicle passes, the opening being divided into an upper opening and a lower opening based on the transport rail, an upper door mounted on the frame and configured to open and close the upper opening, and a lower door mounted on the frame and configured to open and close the lower opening.

10 Claims, 14 Drawing Sheets

(56) References Cited

FOREIGN PATENT DOCUMENTS

| | | |
|---|---|---|
| KR | 10-2003-0085241 | 11/2003 |
| KR | 10-2016-0137425 | 11/2016 |
| KR | 10-1779493 | 9/2017 |
| KR | 10-2019-0024824 | 3/2019 |

OTHER PUBLICATIONS

Machine translation CN110029921 (Year: 2019).*
Machine translation CN107939253 (Year: 2018).*
Machine translation CN113898408 (Year: 2022).*
Office Action dated Oct. 25, 2022 for Korean application No. 10-2020-0176255.
Chinese Office Action, with English Translation, for Chinese Application No. 202111520715.6, dated Aug. 10, 2023.

* cited by examiner

FIREPROOF SHUTTER AND TRANSPORT APPARATUS INCLUDING THE SAME

CROSS-REFERENCE TO RELATED APPLICATION

This application claims the priority benefit of Korean Patent Application No. 10-2020-0176255, filed on Dec. 16, 2020, and all the benefits accruing therefrom under 35 U.S.C. § 119, the contents of which are incorporated by reference in their entirety.

TECHNICAL FIELD

The present invention relates to a fireproof shutter and a transport apparatus including the same. More specifically, the present invention relates to a fireproof shutter for opening and closing a passage through which a transport vehicle moves and a transport apparatus including the same.

BACKGROUND

Generally, in a semiconductor or display manufacturing process, materials such as semiconductor wafers or display substrates may be transported between clean rooms by a transport apparatus. For example, the materials may be transported between the clean rooms by a transport apparatus such as an Overhead Hoist Transport (OHT) apparatus. The transport apparatus may include a transport vehicle for transporting the materials and a transport rail on which the transport vehicle moves, and a passage through which the transport rail passes may be provided in a wall between the clean rooms.

When a fire occurs in any one of the clean rooms, the fire may spread to other clean rooms through the passage, and also smoke and toxic gas due to the fire may be transferred to other clean rooms.

SUMMARY

The present invention provides a fireproof shutter capable of providing a passage for movement of a transport vehicle and blocking flames and smoke when a fire occurs.

In accordance with an aspect of the present invention, a fireproof shutter may include a frame having an opening through which a transport rail for movement of a transport vehicle passes, the opening being divided into an upper opening and a lower opening based on the transport rail, an upper door mounted on the frame and configured to open and close the upper opening, and a lower door mounted on the frame and configured to open and close the lower opening.

In accordance with some embodiments of the present invention, the fireproof shutter may further include a first drive unit for moving the upper door in a vertical direction between an upper open position in which the upper door opens the upper opening and an upper closed position in which the upper door closes the upper opening.

In accordance with some embodiments of the present invention, the fireproof shutter may further include a first guide unit for guiding the upper door in the vertical direction between the upper open position and the upper closed position.

In accordance with some embodiments of the present invention, the fireproof shutter may further include a second drive unit for moving the lower door between a lower open position in which the lower door opens the lower opening and a lower closed position in which the lower door closes the lower opening.

In accordance with some embodiments of the present invention, the lower door may be arranged in a horizontal direction in the lower open position and in a vertical direction in the lower closed position.

In accordance with some embodiments of the present invention, the lower door may include a first end portion adjacent to the frame and a second end portion spaced apart from the frame in the lower open position, and the second drive unit may move the first end portion of the lower door in the vertical direction.

In accordance with some embodiments of the present invention, the second drive unit may include a motor mounted on the frame, a ball screw connected to a rotating shaft of the motor and extending in the vertical direction, and a ball nut engaged with the ball screw and connected to the first end portion of the lower door.

In accordance with some embodiments of the present invention, the fireproof shutter may further include a second guide unit for guiding the second end portion of the lower door in the horizontal direction.

In accordance with some embodiments of the present invention, the second guide unit may include a roller mounted on a side surface of the second end portion of the lower door and a guide member having a channel extending in the horizontal direction, and the roller may be disposed within the channel.

In accordance with some embodiments of the present invention, the second drive unit may rotate the lower door to open and close the lower opening.

In accordance with some embodiments of the present invention, the lower door may include a first lower door rotatably mounted on the frame, a second lower door movably mounted on the first lower door in a sliding manner, and a third lower door movably mounted on the second lower door in a sliding manner.

In accordance with some embodiments of the present invention, the second drive unit may include a first driving section for rotating the lower door and a second driving section for extending and retracting the lower door.

In accordance with some embodiments of the present invention, when the lower door is retracted by the second driving section, the third lower door may be accommodated in the second lower door, and the second lower door may be accommodated in the first lower door.

In accordance with some embodiments of the present invention, a lower surface of the upper door and an upper surface of the lower door may have grooves into which the transport rail is inserted in a state in which the upper door and the lower door are closed.

In accordance with some embodiments of the present invention, a first sealing member may be disposed between a lower surface of the upper door and an upper surface of the lower door in a state in which the upper door and the lower door are closed.

In accordance with some embodiments of the present invention, a second sealing member may be disposed between the upper door and the frame and between the lower door and the frame in a state in which the upper door and the lower door are closed.

In accordance with some embodiments of the present invention, a first expandable member may be disposed between a lower surface of the upper door and an upper surface of the lower door in a state in which the upper door and the lower door are closed. Particularly, the first expandable member may be expanded by heat when a fire occurs to block a gap between the upper door and the lower door.

In accordance with some embodiments of the present invention, a second expandable member may be disposed between the upper door and the frame and between the lower door and the frame in a state in which the upper door and the lower door are closed. Particularly, the second expandable member may be expanded by heat when a fire occurs to block a gap between the upper door and the frame and a gap between the lower door and the frame.

In accordance with some embodiments of the present invention, the fireproof shutter may further include a sensor mounted on the frame and configured to detect the transport vehicle.

In accordance with another aspect of the present invention, a transport apparatus may include a fireproof shutter having an opening disposed between clean rooms, a transport rail extending through the opening, and a transport vehicle configured to be movable along the transport rail. Particularly, the opening may be divided into an upper opening and a lower opening based on the transport rail, and the fireproof shutter may include a frame having the opening, an upper door mounted on the frame and configured to open and close the upper opening, and a lower door mounted on the frame and configured to open and close the lower opening.

In accordance with the embodiments of the present invention as described above, the upper opening may be opened and closed by the upper door, and the lower opening may be opened and closed by the lower door. Accordingly, when a fire occurs, the upper and lower doors may stably close the upper and lower openings, thereby sufficiently preventing the spread of flames and smoke. In addition, the lower door may be arranged in the horizontal direction in a state in which the lower opening is opened, and accordingly, a space required for installing the fireproof shutter may be significantly reduced.

The above summary of the present invention is not intended to describe each illustrated embodiment or every implementation of the present invention. The detailed description and claims that follow more particularly exemplify these embodiments.

BRIEF DESCRIPTION OF THE DRAWINGS

Exemplary embodiments can be understood in more detail from the following description taken in conjunction with the accompanying drawings, in which.

Figure 1:
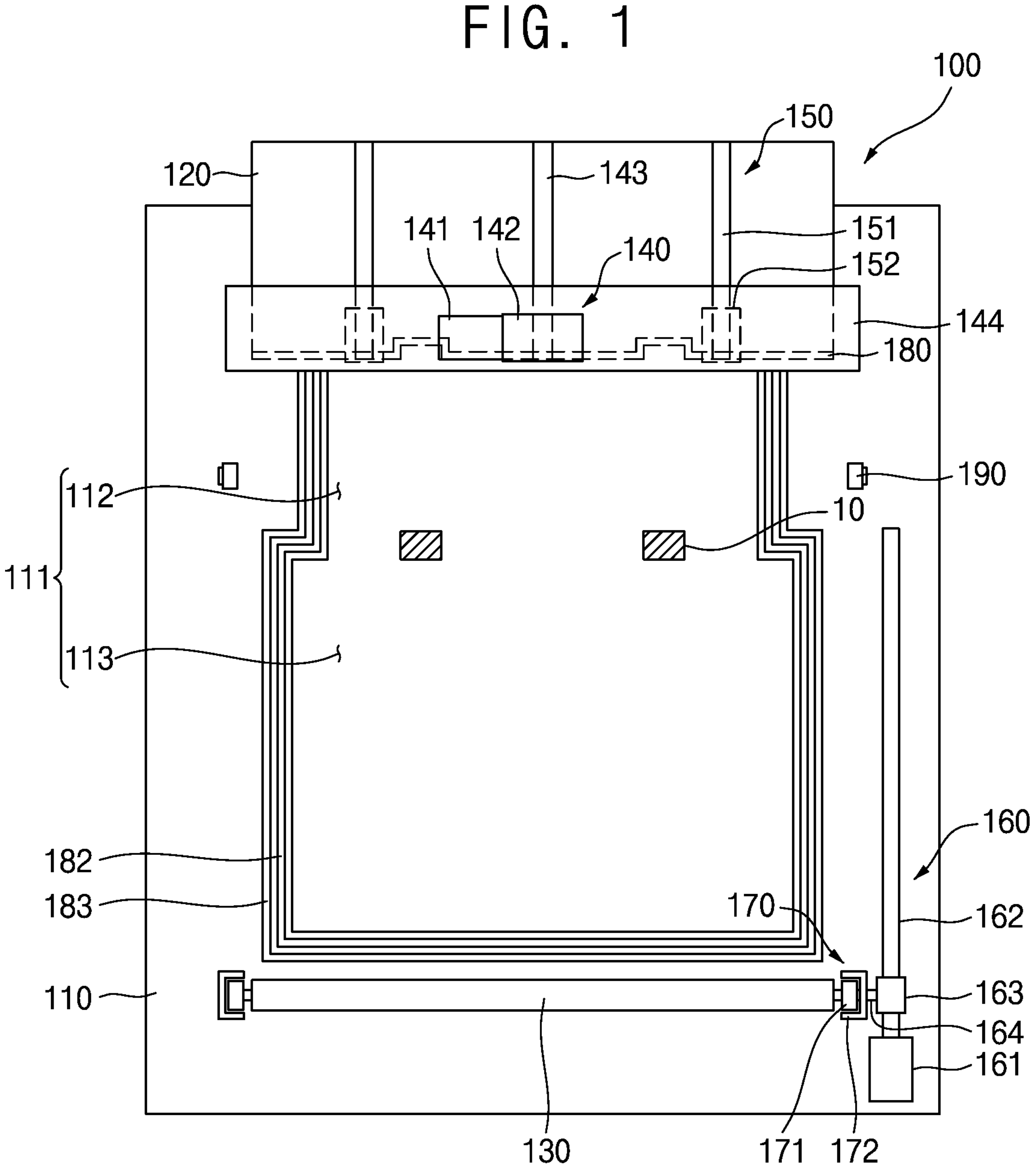
FIG. 1 is a schematic front view illustrating an open state of a fireproof shutter in accordance with an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Hereinafter, embodiments of the present invention are described in more detail with reference to the accompanying drawings. However, the present invention is not limited to the embodiments described below and is implemented in various other forms. Embodiments below are not provided to fully complete the present invention but rather are provided to fully convey the range of the present invention to those skilled in the art.

In the specification, when one component is referred to as being on or connected to another component or layer, it can be directly on or connected to the other component or layer, or an intervening component or layer may also be present. Unlike this, it will be understood that when one component is referred to as directly being on or directly connected to another component or layer, it means that no intervening component is present. Also, though terms like a first, a second, and a third are used to describe various regions and layers in various embodiments of the present invention, the regions and the layers are not limited to these terms.

Terminologies used below are used to merely describe specific embodiments, but do not limit the present invention. Additionally, unless otherwise defined here, all the terms including technical or scientific terms, may have the same meaning that is generally understood by those skilled in the art.

Embodiments of the present invention are described with reference to schematic drawings of ideal embodiments. Accordingly, changes in manufacturing methods and/or allowable errors may be expected from the forms of the drawings. Accordingly, embodiments of the present invention are not described being limited to the specific forms or areas in the drawings, and include the deviations of the forms. The areas may be entirely schematic, and their forms may not describe or depict accurate forms or structures in any given area, and are not intended to limit the scope of the present invention.

Figure 2:
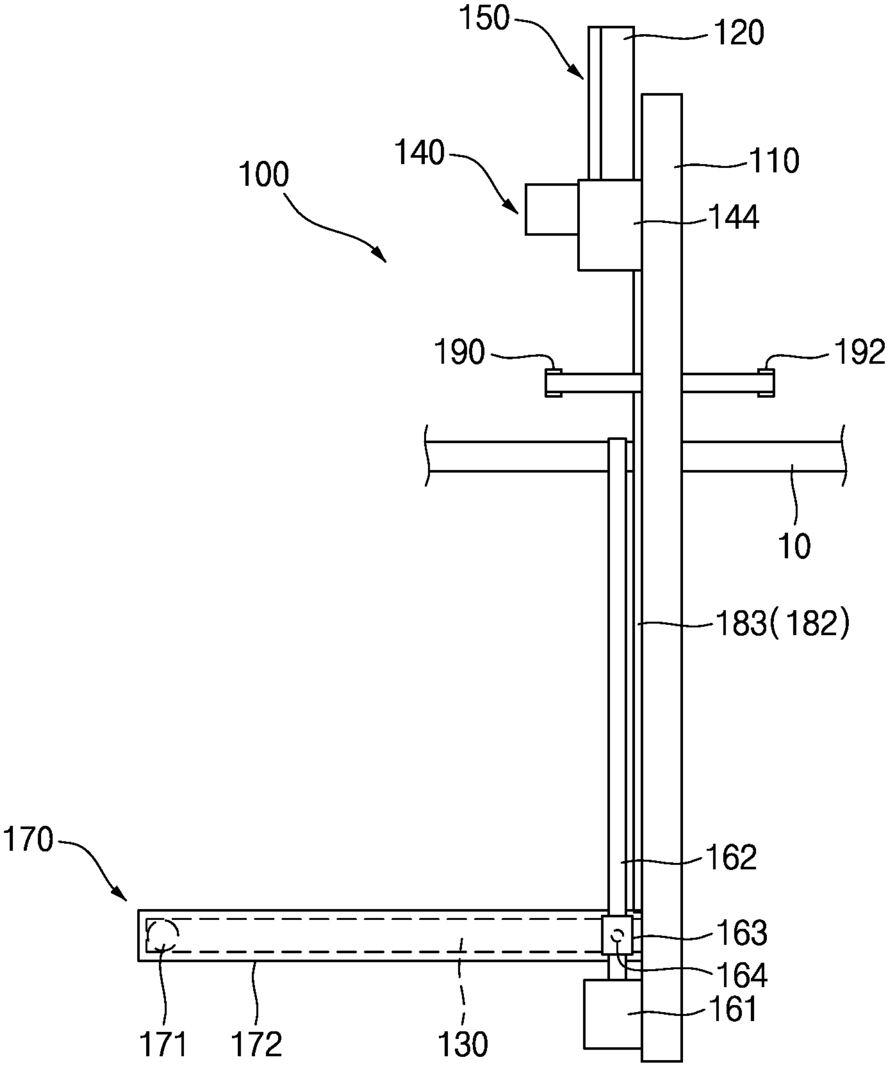
FIG. 2 is a schematic side view illustrating the open state of the fireproof shutter as shown in FIG. 1.
Figure 3:
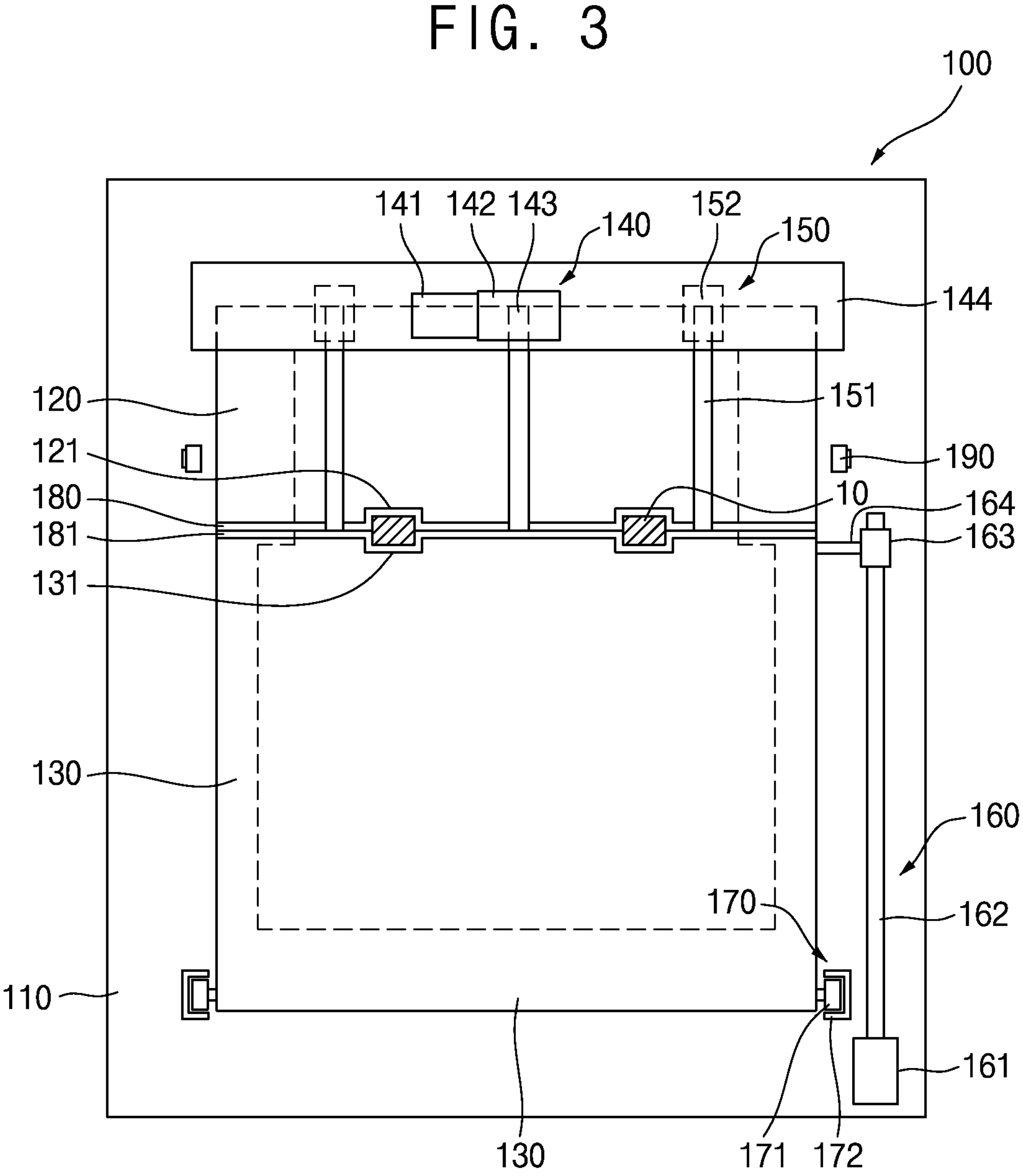
FIG. 3 is a schematic front view illustrating a closed state of the fireproof shutter as shown in FIG. 1.
Figure 4:
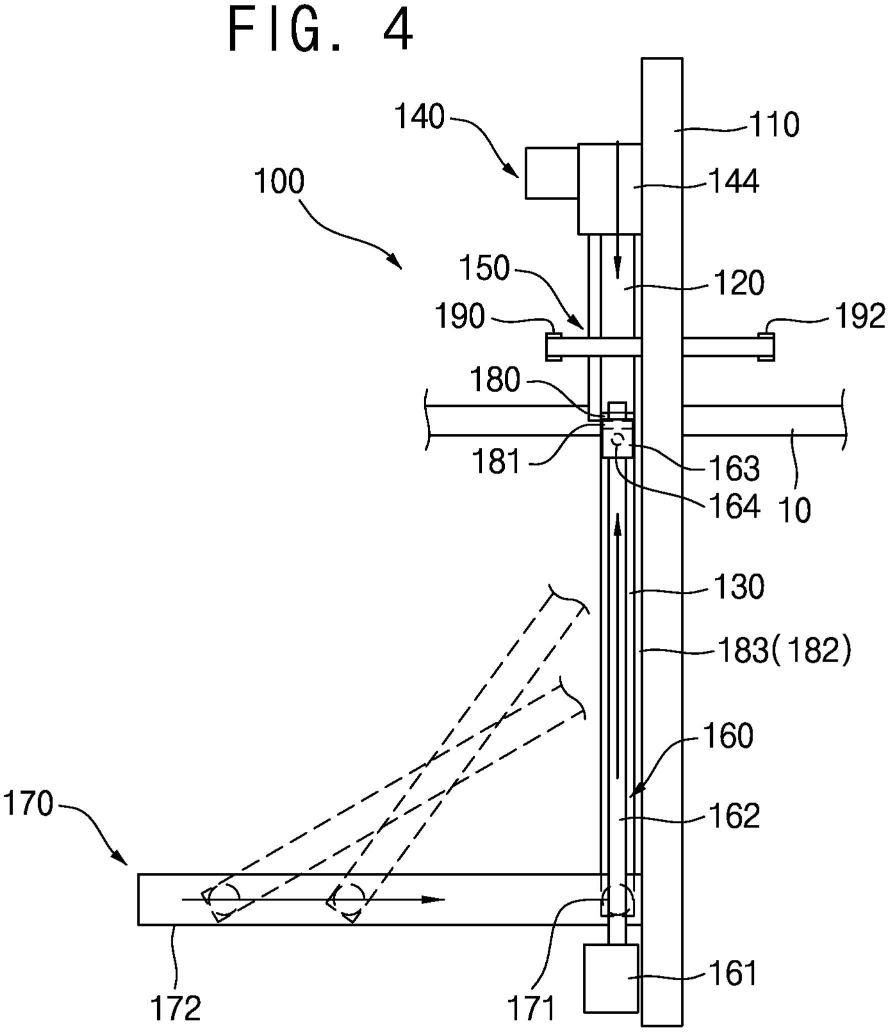
FIG. 4 is a schematic side view illustrating the closed state of the fireproof shutter as shown in FIG. 3.

FIG. 1 is a schematic front view illustrating an open state of a fireproof shutter in accordance with an embodiment of the present invention, and FIG. 2 is a schematic side view illustrating the open state of the fireproof shutter as shown in FIG. 1. FIG. 3 is a schematic front view illustrating a closed state of the fireproof shutter as shown in FIG. 1, and FIG. 4 is a schematic side view illustrating the closed state of the fireproof shutter as shown in FIG. 3.

Referring to FIGS. 1 to 4, a fireproof shutter 100, in accordance with an embodiment of the present invention, may be mounted on a wall (not shown) between clean rooms in which semiconductor device or display device manufacturing processes are performed, and may provide a passage through which a transport vehicle 420 (refer to FIGS. 13 and 14) for transporting materials passes. Further, the fireproof shutter 100 may be used to open and close the passage, and a transport rail 10 for movement of the transport vehicle may be disposed through the passage.

The fireproof shutter 100 may include a frame 110 disposed in a vertical direction and having an opening 111 used as the passage. For example, the frame 110 may be mounted on the wall, and the opening 111 may include an upper opening 112 above the transport rail 10 and a lower opening 113 below the transport rail 10. That is, the opening 111 may be divided into an upper opening 112 and a lower opening 113 based on the transport rail 10. Further, the fireproof shutter 100 may include an upper door 120 mounted on a front surface of the frame 110 and configured to open and close the upper opening 112, and a lower door 130 mounted on the front surface of the frame 110 and configured to open and close the lower opening 113.

The upper door 120 may be provided to be movable between an upper open position in which the upper door 120 opens the upper opening 112 and an upper closed position in which the upper door 120 closes the upper opening 112. For example, the upper door 120 may be disposed parallel to the frame 110, that is, in a vertical direction, and may move in the vertical direction to open and close the upper opening 112.

The lower door 130 may be provided to be movable between a lower open position in which the lower door 130 opens the lower opening 113 and a lower closed position in which the lower door 130 closes the lower opening 113. For example, the lower door 130 may be arranged on a lower front portion of the frame 110 below the lower opening 113 in a horizontal direction in the lower open position, and may be arranged in a direction parallel to the frame 110, that is, in the vertical direction in the lower closed position. As described above, since the lower door 130 may be horizontally arranged on the lower front portion of the frame 110 in the lower open position, the space required to install the fireproof shutter 100 may be reduced.

When the upper door 120 and the lower door 130 are closed, a lower surface of the upper door 120 and an upper surface of the lower door 130 may be in close contact with each other. Further, the lower surface of the upper door 120 and the upper surface of the lower door 130 may be in close contact with the transport rail 10. For example, as shown in FIG. 3, the lower surface of the upper door 120 and the upper surface of the lower door 130 may have grooves 121 and 131 into which the transport rail 10 is inserted in a state in which the upper door 120 and the lower door 130 are closed.

The fireproof shutter 100 may include a first drive unit 140 that vertically moves the upper door 120 between the upper open position and the upper closed position. For example, the first drive unit 140 may include a first motor 141, a pinion gear 142 and a rack gear 143, and a bracket 144 to which the first drive unit 140 is mounted may be disposed on the front surface of the frame 110. The bracket 144 may have a gantry shape extending in a horizontal direction, and the first motor 141 may be mounted on the bracket 144. The pinion gear 142 may be connected to the first motor 141, and the rack gear 143 may be engaged with the pinion gear 142. The rack gear 143 may be vertically disposed on a front surface of the upper door 120.

The fireproof shutter 100 may include a first guide unit 150 for guiding the upper door 120 in the vertical direction between the upper open position and the upper closed position. For example, the first guide unit 150 may include a guide rail 151 and a guide block 152. The guide rail 151 may be vertically disposed on the front surface of the upper door 120, and the guide block 152 may be mounted on the bracket 144 to be coupled to the guide rail 151. As an example, a linear motion guide mechanism may be used as the first guide unit 150.

The fireproof shutter 100 may include a second drive unit 160 that moves the lower door 130 between the lower open position and the lower closed position. For example, the lower door 130 may include a first end portion adjacent to the frame 110 and a second end portion spaced apart from the frame 110 in a horizontal direction in the lower open position, and the second drive unit 160 may vertically move the first end portion of the lower door 130. In particular, when the second drive unit 160 moves the first end portion of the lower door 130 upward to close the lower opening 113, the second end portion of the lower door 130 may be horizontally moved toward the frame 110.

For example, the second drive unit 160 may be mounted on the front surface of the frame 110, and may include a second motor 161, a ball screw 162, and a ball nut 163. The ball screw 162 may be connected to a rotating shaft of the second motor 161 and may extend in the vertical direction. The ball nut 163 may be engaged with the ball screw 162 to be movable in the vertical direction, and may be connected to the first end portion of the lower door 130 through a connecting shaft 164.

As another example, the second drive unit 160 may include a pneumatic cylinder or a linear motor. When the second drive unit 160 includes a pneumatic cylinder, the first end portion of the lower door 130 may be connected to a rod of the pneumatic cylinder. When the second drive unit 160 includes a linear motor, the first end portion of the lower door 130 may be connected to a movable member of the linear motor.

The fireproof shutter 100 may include a second guide unit 170 for guiding the second end portion of the lower door 130 in the horizontal direction between the lower open position and the lower closed position. For example, the second guide unit 170 may include a roller 171 and a guide member 172. The roller 171 may be mounted on a side surface of the second end portion of the lower door 130, and the guide member 172 may extend in the horizontal direction from a lower front surface of the frame 110. The guide member 172 may have a channel formed in the horizontal direction, and the roller 171 may be disposed in the channel. In addition, the guide member 172 may support the lower door 130 in the lower open position.

In accordance with an embodiment of the present invention, a first sealing member 180 may be disposed between the lower surface of the upper door 120 and the upper surface of the lower door 130 in a state in which the upper door 120 and the lower door 130 are closed. The first sealing member 180 may be used to seal between the upper door 120 and the lower door 130. For example, as shown in FIG. 1, the first sealing member 180 may have a ribbon shape extending in a horizontal direction, and may be attached to the lower surface of the upper door 120. As another example, the first sealing member 180 may be attached on the upper surface of the lower door 130.

Further, a second sealing member 182 may be disposed between the upper door 120 and the frame 110 and between the lower door 130 and the frame 110 in a state in which the upper door 120 and the lower door 130 are closed. For example, the second sealing member 182 may be attached to the front surface of the frame 110 to surround the opening 111, and thus a gap between the upper and lower doors 120 and 130 and the frame 110 may be sealed. Accordingly, when a fire occurs, flames, smoke and gas may be blocked by the first sealing member 180 and the second sealing member 182.

In accordance with an embodiment of the present invention, a first expandable member 181 may be disposed between the lower surface of the upper door 120 and the upper surface of the lower door 130 in a state in which the upper door 120 and the lower door 130 are closed. For example, the first expandable member 181 may have a ribbon shape extending in a horizontal direction and may be attached to the lower surface of the upper door 120. As another example, the first expandable member 181 may be attached to the upper surface of the lower door 130. The first expandable member 181 may expand by heat when a fire occurs to block a gap between the upper door 120 and the lower door 130.

Further, a second expandable member 183 may be disposed between the upper door 120 and the frame 110 and between the lower door 130 and the frame 110 in a state in which the upper door 120 and the lower door 130 are closed. For example, the second expandable member 183 may be attached to the front surface of the frame 110 to surround the opening 111. The second expandable member 183 may expand by heat when a fire occurs to block a gap between the upper door 120 and the frame 110 and a gap between the lower door 130 and the frame 110. For example, Fi-Block (registered trademark) available from Sekisui Chemical Co., Ltd. may be used as the first expandable member 181 and the second expandable member 183.

In accordance with an embodiment of the present invention, the fireproof shutter 100 may include sensors 190 and 192 for detecting the transport vehicle positioned on the transport rail 10 before the operations of the upper door 120 and the lower door 130. For example, optical sensors may be used as the sensors 190 and 192. Specifically, a first sensor 190 may be mounted on the front surface of the frame 110, and a second sensor 192 may be mounted on a rear surface of the frame 110.

Although not shown in figures, the fireproof shutter 100 may include a control unit (not shown) for controlling the operations of the upper door 120 and the lower door 130. Specifically, the control unit may control the operations of the first and second drive units 140 and 160 to close the upper door 120 and the lower door 130 when a fire occurs. Particularly, when the transport vehicle is detected by the first and/or second sensors 190 and/or 192, the control unit may stop the operations of the upper door 120 and the lower door 130. Further, after the transport vehicle has moved through the opening 111, that is, when the transport vehicle is not detected by the first and second sensors 190 and 192, the control unit may resume the operations of the upper door 120 and the lower door 130.

Figure 5:
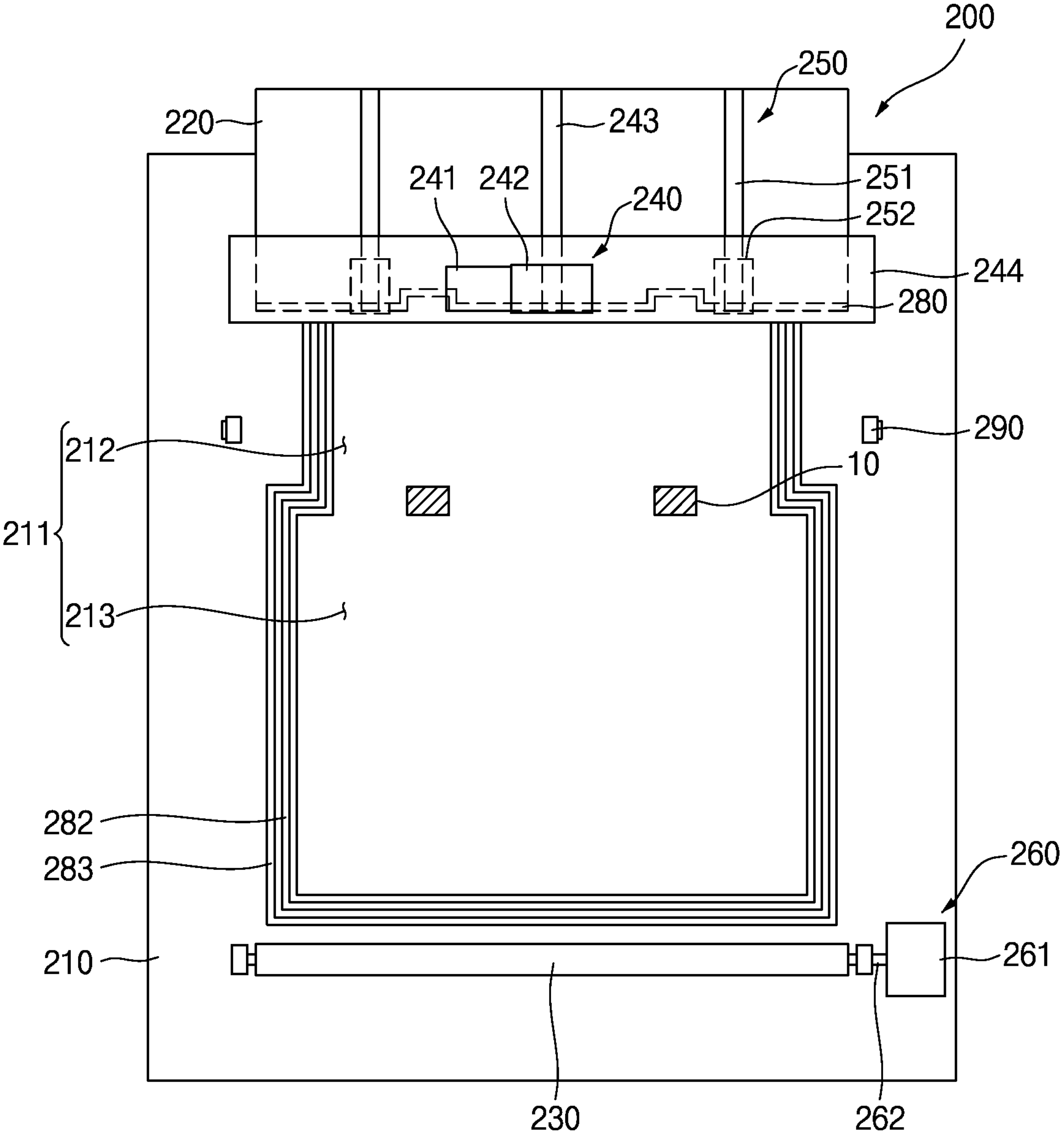
FIG. 5 is a schematic front view illustrating an open state of a fireproof shutter in accordance with another embodiment of the present invention.
Figure 6:
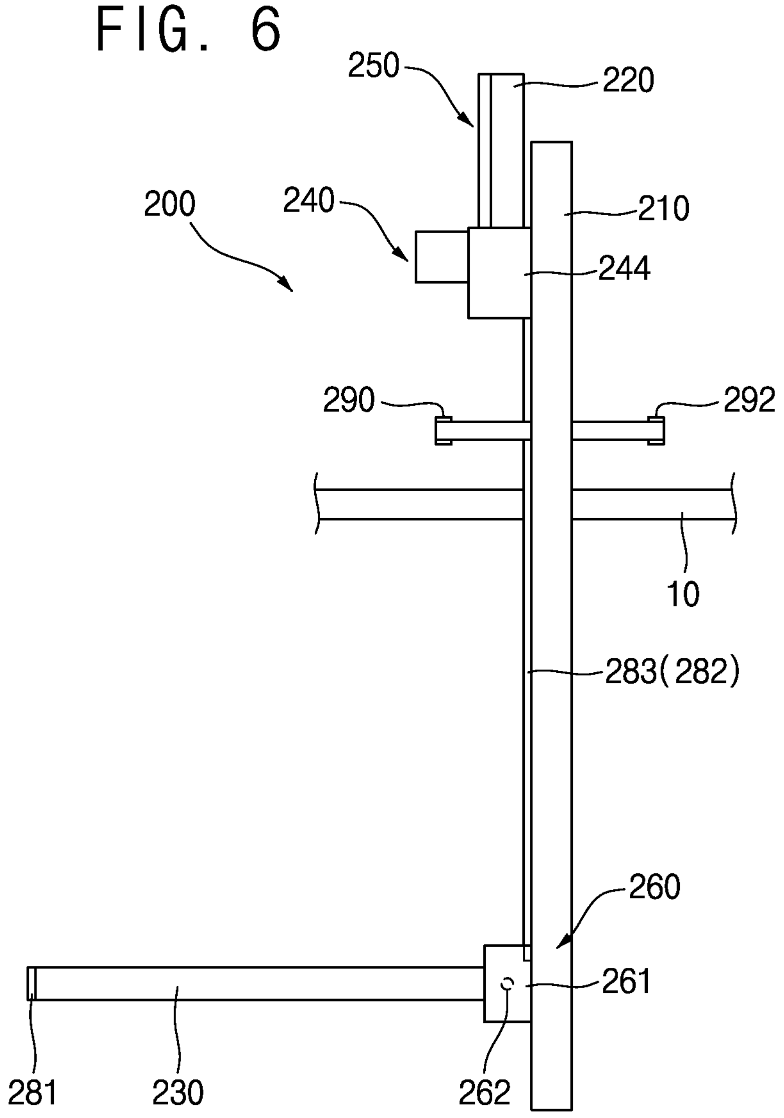
FIG. 6 is a schematic side view illustrating the open state of the fireproof shutter as shown in FIG. 5.
Figure 7:
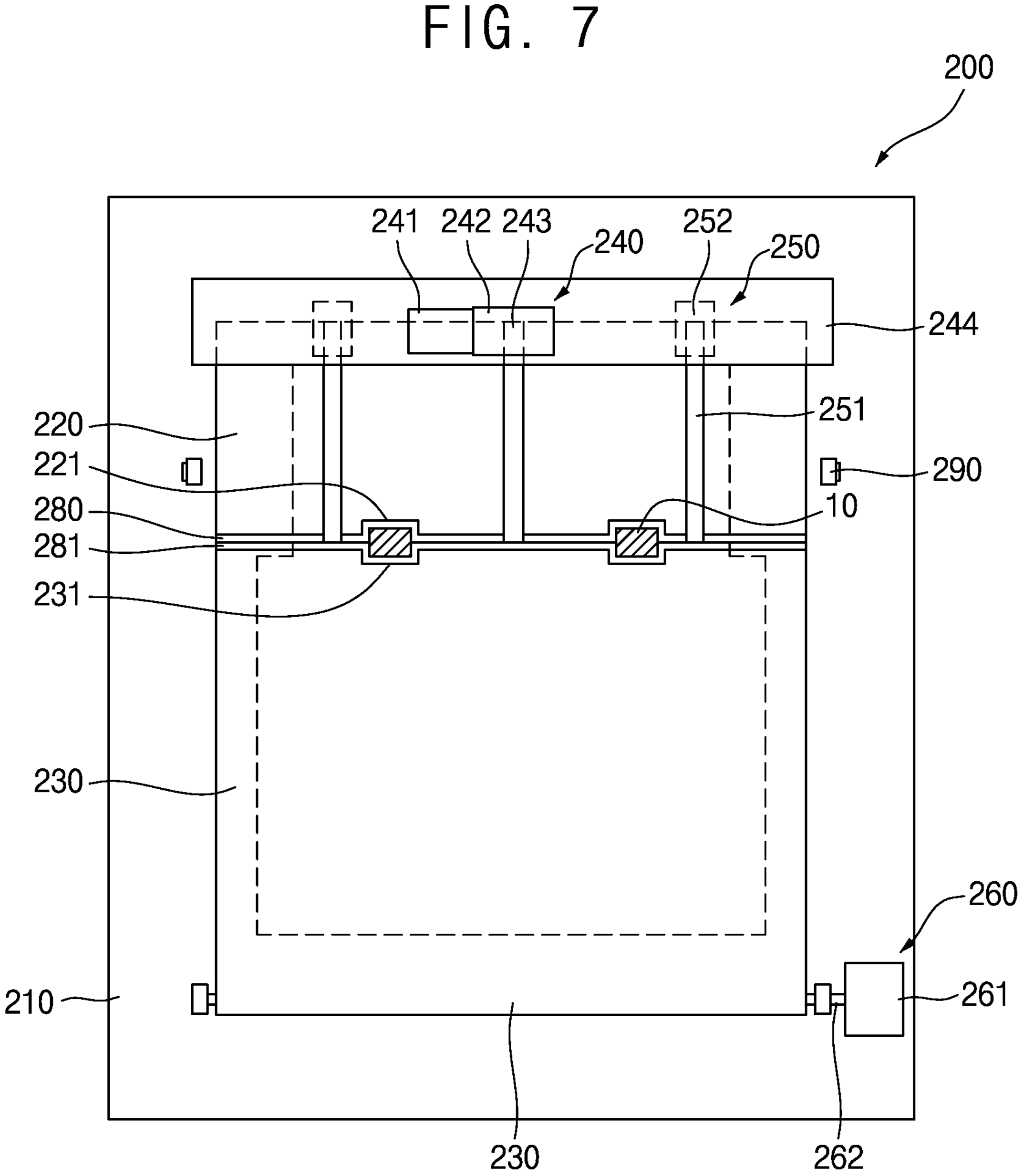
FIG. 7 is a schematic front view illustrating a closed state of the fireproof shutter as shown in FIG. 5.
Figure 8:
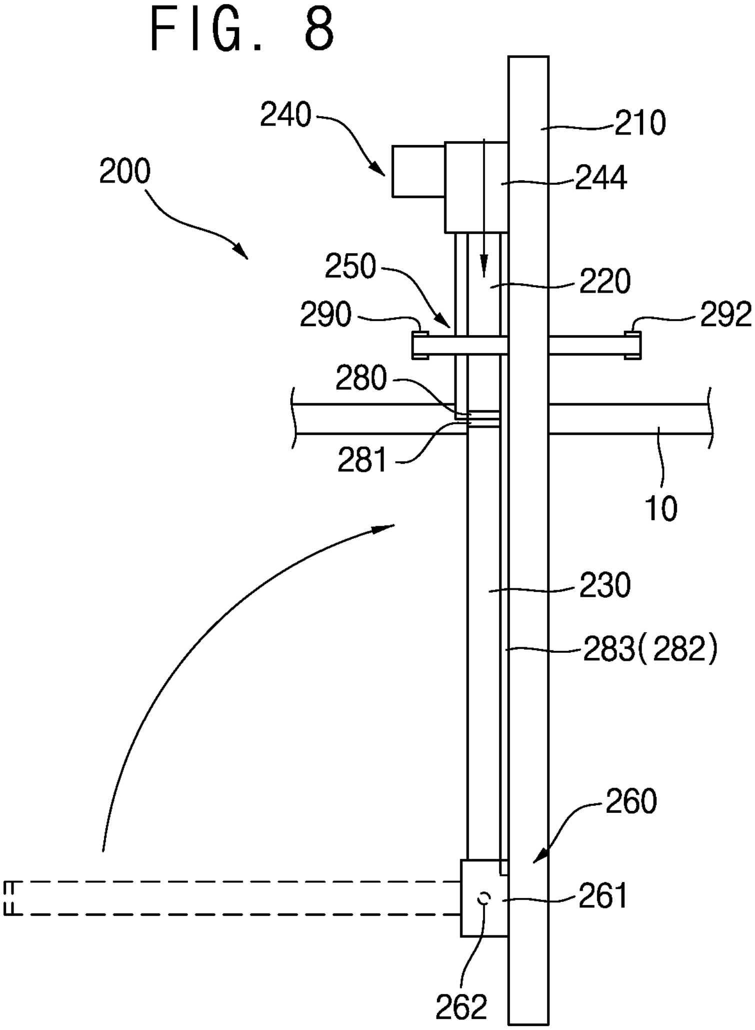
FIG. 8 is a schematic side view illustrating the closed state of the fireproof shutter as shown in FIG. 7.

FIG. 5 is a schematic front view illustrating an open state of a fireproof shutter in accordance with another embodiment of the present invention, and FIG. 6 is a schematic side view illustrating the open state of the fireproof shutter as shown in FIG. 5. FIG. 7 is a schematic front view illustrating a closed state of the fireproof shutter as shown in FIG. 5, and FIG. 8 is a schematic side view illustrating the closed state of the fireproof shutter as shown in FIG. 7.

Referring to FIGS. 5 to 8, a fireproof shutter 200, in accordance with another embodiment of the present invention, may include a frame 210, an upper door 220, a lower door 230, a first drive unit 240, a guide unit 250, a second drive unit 260, first and second sealing members 280 and 282, first and second expandable members 281 and 283, and first and second sensors 290 and 292.

The frame 210 may have an opening 211 including an upper opening 212 and a lower opening 213. The upper door 220 may have a groove 221 into which the transport rail 10 is inserted, and the lower door 230 may have a groove 231 into which the transport rail 10 is inserted. The first drive unit 240 may include a first motor 241, a pinion gear 242 and a rack gear 243, and the first guide unit 250 may include a guide rail 251 and a guide block 252. In addition, the fireproof shutter 200 may include a bracket 244 for mounting the first drive unit 240 and the first guide unit 250.

The frame 210, the upper door 220, the first drive unit 240, the guide unit 250, the first and second sealing members 280 and 282, the first and second expandable members 281 and 283, and the first and second sensors 290 and 292 are substantially the same as those previously described with reference to FIGS. 1 to 4, and accordingly, additional description thereof will be omitted.

The lower door 230 may be rotatably mounted on a front surface of the frame 210, and the second drive unit 260 may rotate the lower door 230 to open and close the lower opening 213. Specifically, the lower door 230 may be disposed in a horizontal direction in a lower open position for opening the lower opening 213, and may include a first end portion spaced apart from the frame 210 and a second end portion adjacent to the frame 210.

For example, the second drive unit 260 may include a second motor 261 mounted on the front surface of the frame 210 and configured to rotate the lower door 230, and a rotating shaft 262 connecting the second motor 261 and the second end portion of the lower door 230. As an example, the second motor 261 may close the lower opening 213 by rotating the lower door 230 in a clockwise direction, and may open the lower opening 213 by rotating the lower door 230 in a counterclockwise direction.

Figure 9:
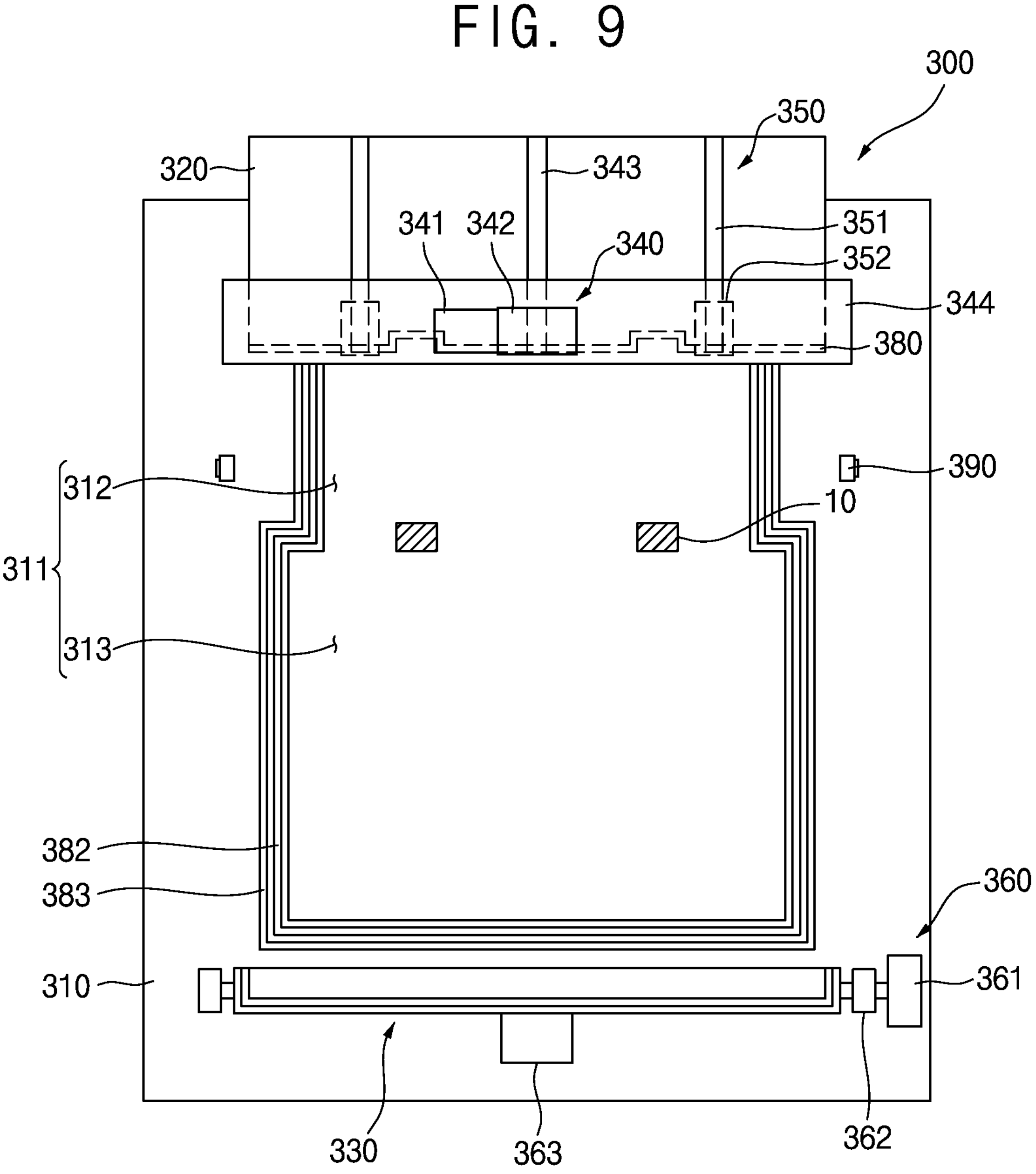
FIG. 9 is a schematic front view illustrating an open state of a fireproof shutter in accordance with still another embodiment of the present invention.
Figure 10:
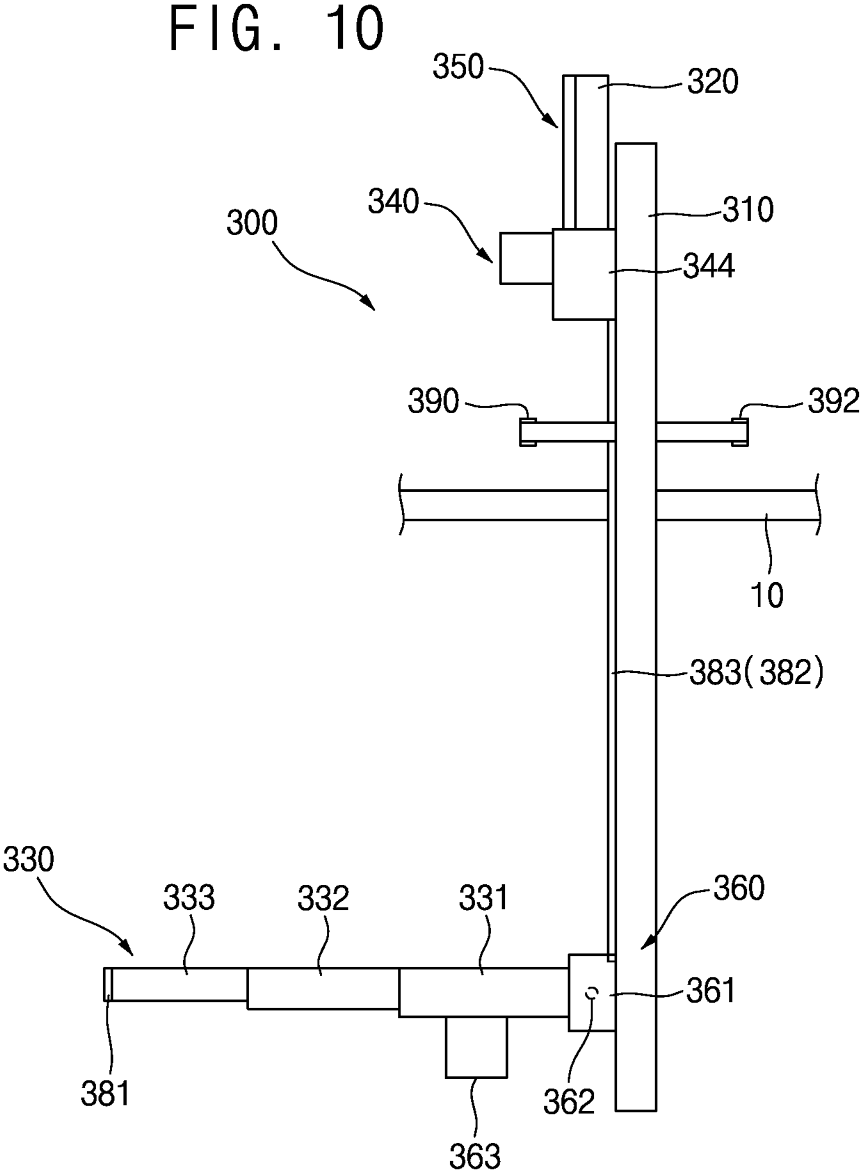
FIG. 10 is a schematic side view illustrating the open state of the fireproof shutter as shown in FIG. 9.
Figure 11:
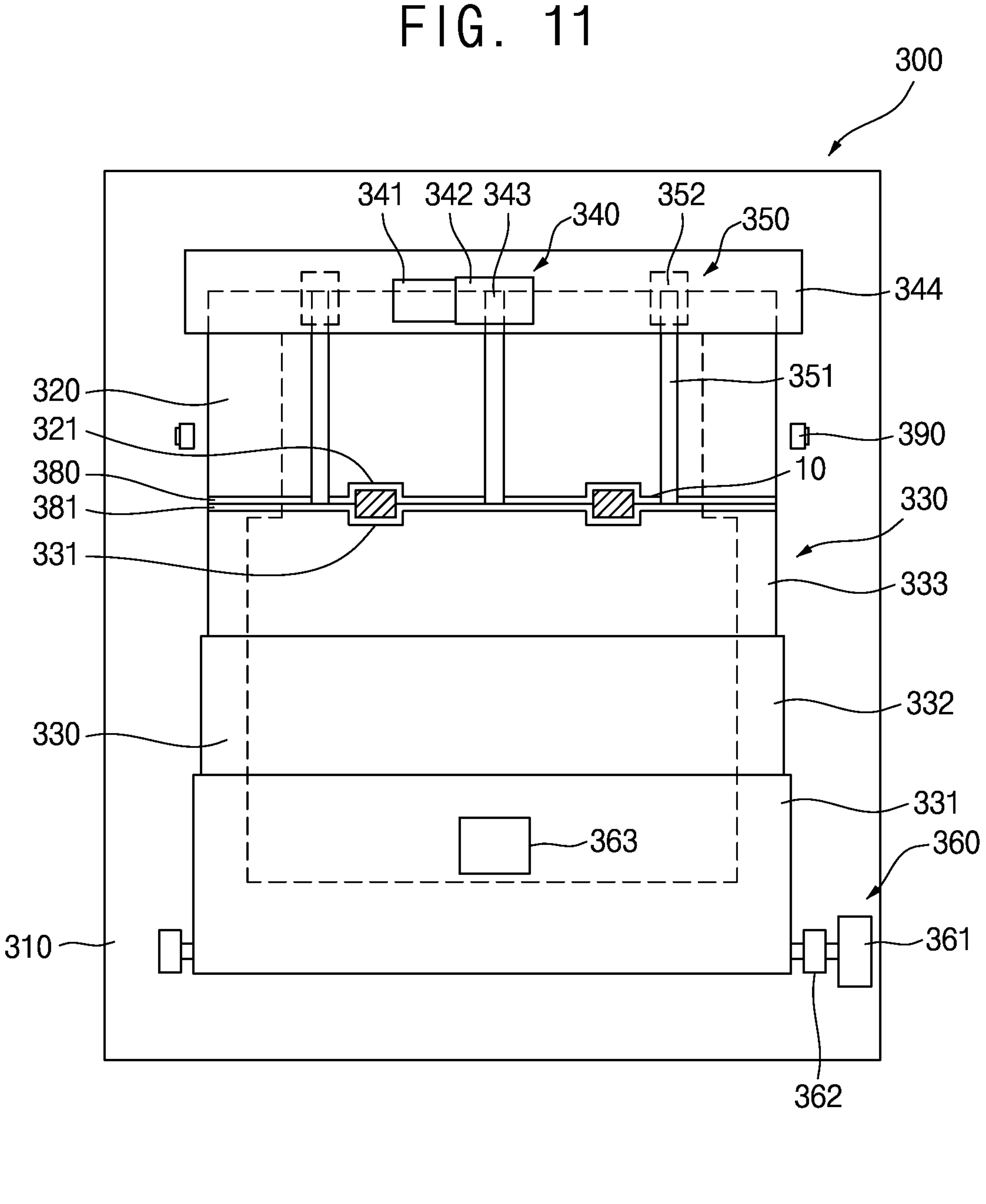
FIG. 11 is a schematic front view illustrating a closed state of the fireproof shutter as shown in FIG. 9.
Figure 12:
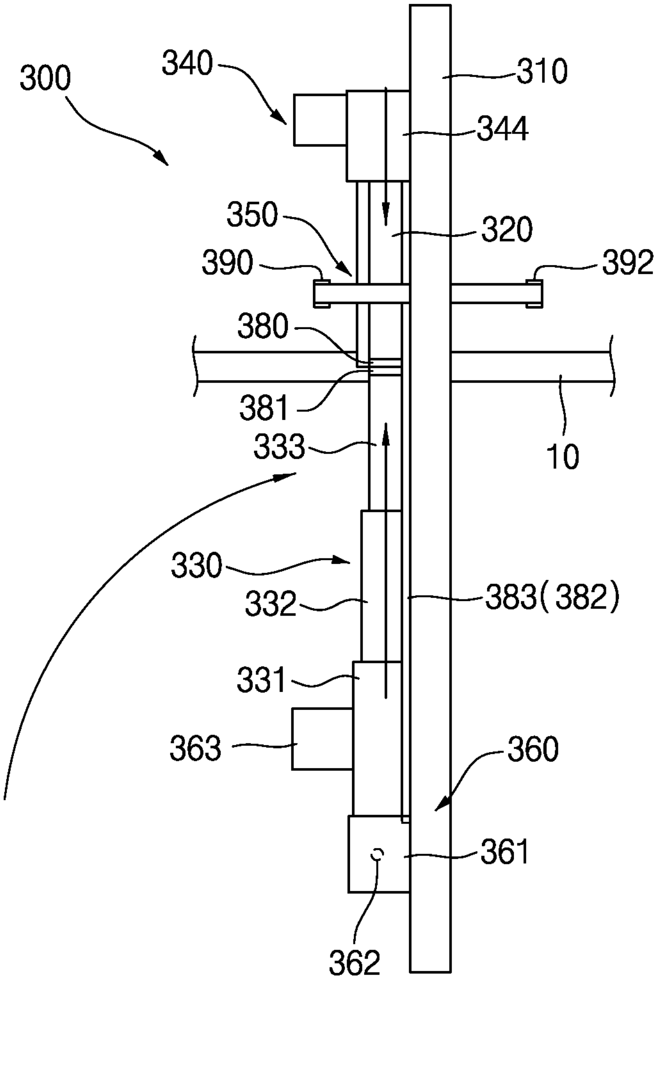
FIG. 12 is a schematic side view illustrating the closed state of the fireproof shutter as shown in FIG. 11.

FIG. 9 is a schematic front view illustrating an open state of a fireproof shutter in accordance with still another embodiment of the present invention, and FIG. 10 is a schematic side view illustrating the open state of the fireproof shutter as shown in FIG. 9. FIG. 11 is a schematic front view illustrating a closed state of the fireproof shutter as shown in FIG. 9, and FIG. 12 is a schematic side view illustrating the closed state of the fireproof shutter as shown in FIG. 11.

Referring to FIGS. 9 to 12, a fireproof shutter 300, in accordance with still another embodiment of the present invention, may include a frame 310, an upper door 320, a lower door 330, a first drive unit 340, a guide unit 350, a second drive unit 360, first and second sealing members 380 and 382, first and second expandable members 381 and 383, and first and second sensors 390 and 392.

The frame 310 may have an opening 311 including an upper opening 312 and a lower opening 313. The upper door 320 may have a groove 321 into which the transport rail 10 is inserted, and the lower door 330 may have a groove 331 into which the transport rail 10 is inserted. The first drive unit 340 may include a first motor 341, a pinion gear 342 and a rack gear 343, and the first guide unit 350 may include a guide rail 351 and a guide block 352. In addition, the fireproof shutter 300 may include a bracket 344 for mounting the first drive unit 340 and the first guide unit 350.

The frame 310, the upper door 320, the first drive unit 340, the guide unit 350, the first and second sealing members 380 and 382, the first and second expandable members 381 and 383, and the first and second sensors 390 and 392 are substantially the same as those previously described with reference to FIGS. 1 to 4, and accordingly, additional description thereof will be omitted.

The lower door 330 may be rotatably mounted on a front surface of the frame 310, and the second drive unit 360 may rotate the lower door 330 to open and close the lower opening 313.

The lower door 330 may be arranged in a horizontal direction in a lower open position for opening the lower opening 313. The second drive unit 360 may include a first driving section 361 mounted on the front surface of the frame 310 and configured to rotate the lower door 330, and a rotating shaft 362 connecting the first driving section 361 and the lower door 330. For example, the first driving section 361 may include a motor. Further, the first driving section 361 may close the lower opening 313 by rotating the lower door 330 in a clockwise direction, and may open the lower opening 313 by rotating the lower door 330 in a counterclockwise direction.

Particularly, the lower door 330 may include a first lower door 331 rotatably mounted on the front surface of the frame 310, a second lower door 332 movably mounted on the first lower door 331 in a sliding manner, and a third lower door 333 movably mounted on the second lower door 332 in a sliding manner.

The second drive unit 360 may include a second driving section 363 for extending and retracting the lower door 330. Particularly, when the lower door 330 is retracted by the second driving section 363, the third lower door 333 may be accommodated in the second lower door 332, and the second lower door 332 may be accommodated in the first lower door 331.

As an example, the second driving section 363 may include a pneumatic cylinder, and may retract the lower door 330 in a state in which the lower opening 313 is open. Further, while the lower door 330 is rotated by the first driving section 361 or before the lower door 330 is rotated by the first driving section 361, the second driving unit 363 may extend the lower door 330 to close the lower opening 313. As another example, after the lower opening 313 is partially closed as the lower door 330 is rotated by the first driving section 361, the second driving section 363 may extend the lower door 330 to completely close the lower opening 313. As described above, the lower door 330 may be retracted by the second driving section 363 in the lower open position, and thus, the space required for installation and operation of the fireproof shutter 300 may be significantly reduced.

Figure 13:
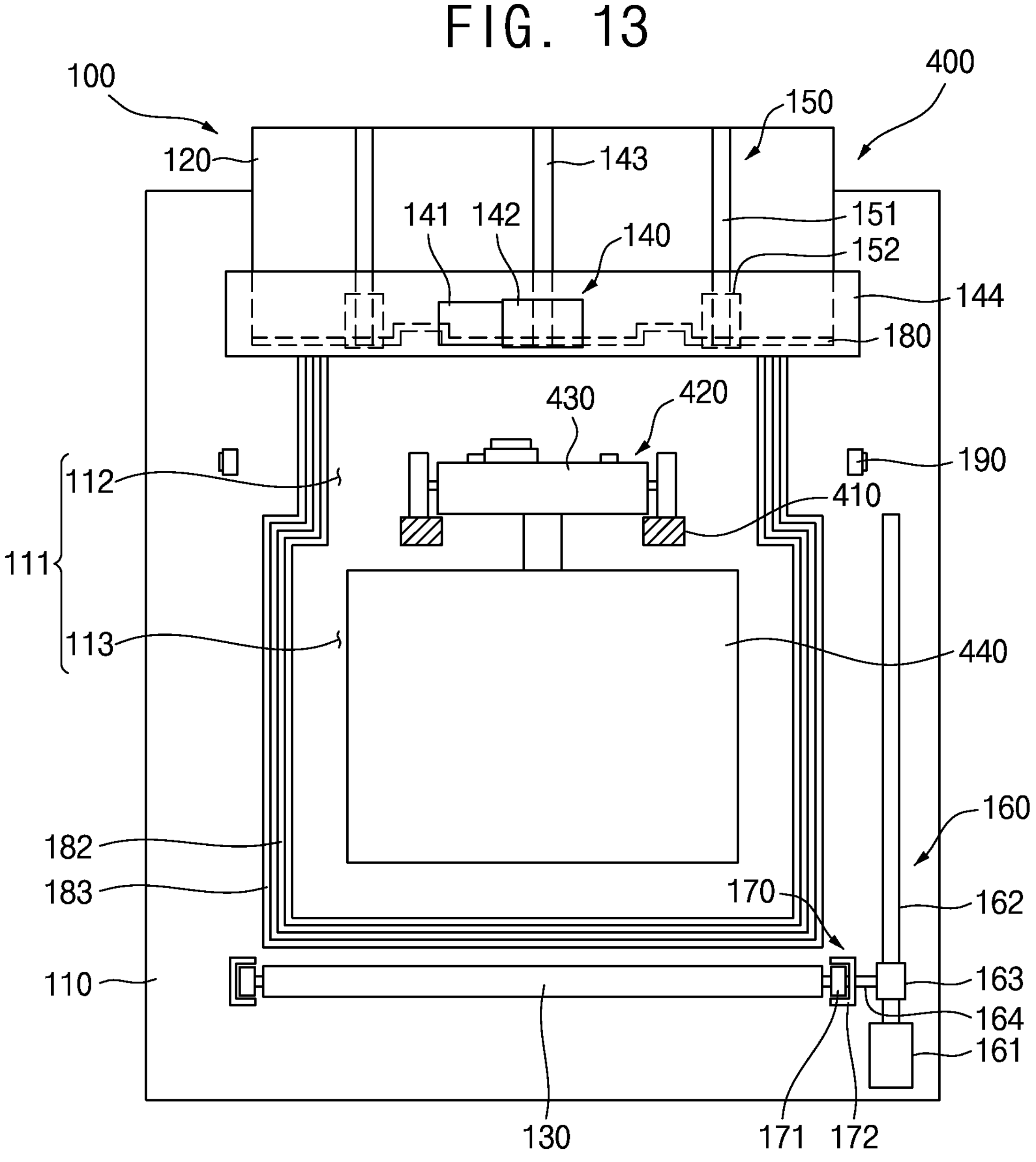
FIG. 13 is a schematic front view illustrating a transport apparatus in accordance with still another embodiment of the present invention.
Figure 14:
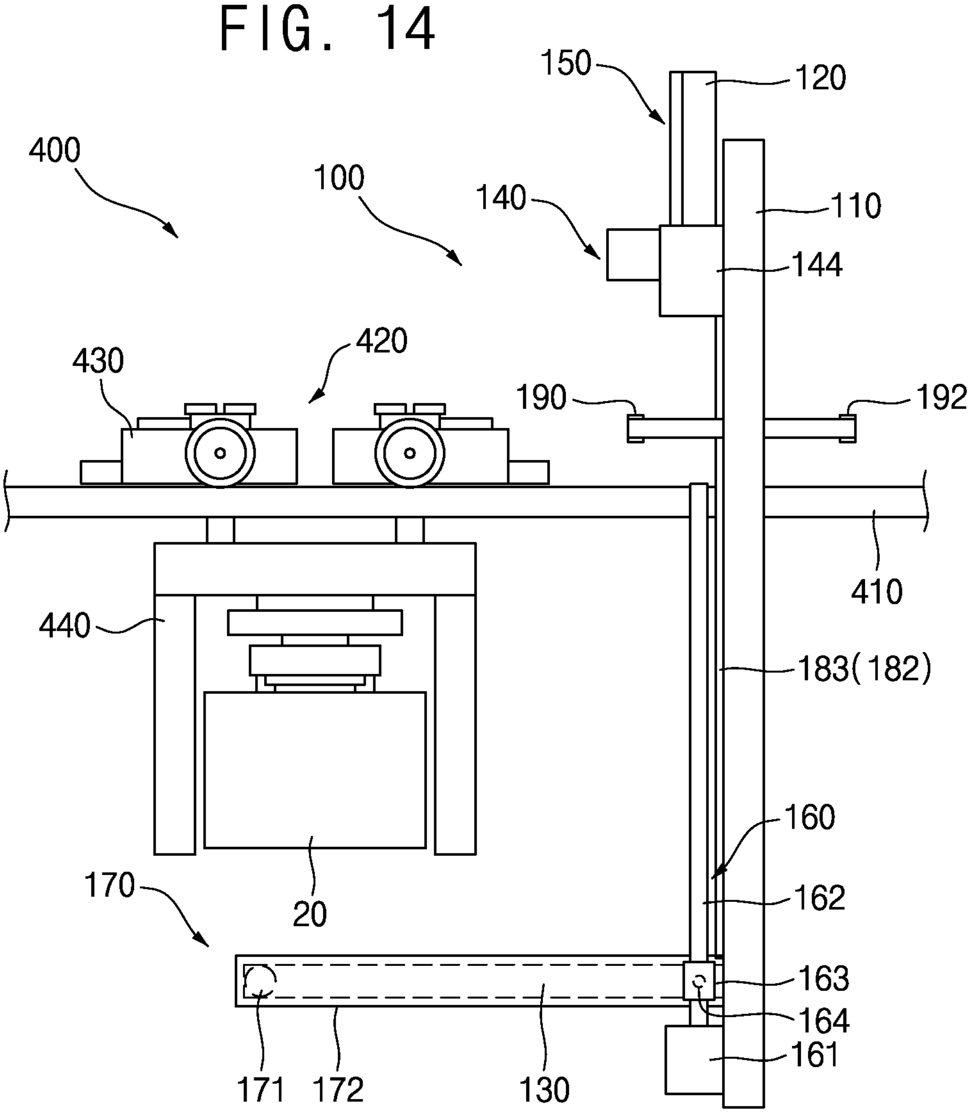
FIG. 14 is a schematic side view illustrating the transport apparatus as shown in FIG. 13.

FIG. 13 is a schematic front view illustrating a transport apparatus in accordance with still another embodiment of the present invention, and FIG. 14 is a schematic side view illustrating the transport apparatus as shown in FIG. 13.

Referring to FIGS. 13 and 14, a transport apparatus 400, in accordance with still another embodiment of the present invention, may be used to transport materials 20 such as semiconductor wafers or display substrates between clean rooms in which semiconductor or display manufacturing processes are performed. The transport apparatus 400 may include a transport rail 410, a transport vehicle 420, and a fireproof shutter 100.

The transport rail 410 may extend through the opening 111 of the fireproof shutter 100, and the transport vehicle 420 may be configured to be movable along the transfer rail 410. The transport vehicle 420 may include a driving module 430 configured to be movable on the transport rail 410, and a hoist module 440 connected to a lower portion of the driving module 430 and configured to elevate the materials 20.

Although not shown in detail, the driving module 430 may include a front driving unit including front wheels disposed on the transport rail 410, and a rear driving unit including rear wheels disposed on the transport rail 410. The hoist module 440 may include a housing connected to lower portions of the front and rear driving units and having an inner space for accommodating the materials 20, and a hoist unit disposed in the housing and for elevating the materials 20. The hoist unit may include a hand unit for holding the materials 20 and may vertically move the hand unit using an elevating belt.

The fireproof shutter 100 may include an upper door 120 and a lower door 130 for opening and closing the opening 111. The fireproof shutter 100 is the same as previously described with reference to FIGS. 1 to 4, and thus, detailed description thereof will be omitted. As another example, the transport apparatus 400 may include the fireproof shutter 200 as shown in FIGS. 5 to 8 or the fireproof shutter 300 as shown in FIGS. 9 to 12 instead of the fireproof shutter 100.

Although the example embodiments of the present invention have been described with reference to the specific embodiments, they are not limited thereto. Therefore, it will be readily understood by those skilled in the art that various modifications and changes can be made thereto without departing from the spirit and scope of the appended claims.

The invention claimed is:

1. A fireproof shutter comprising:

a frame having an opening through which a transport rail for movement of a transport vehicle passes, the opening being divided into an upper opening and a lower opening based on the transport rail;

an upper door mounted on the frame and configured to open and close the upper opening;

a lower door mounted on the frame and configured to open and close the lower opening; and a first sensor and a second sensor configured to detect the transport vehicle positioned on the transport rail before the operations of the upper door and the lower door, wherein the first sensor and the second sensor are optical sensors configured to detect the transport vehicle positioned on the transport rail prior to activation of the first drive unit and the second drive unit, the first sensor being disposed on a front surface of the frame and the second sensor on a rear surface of the frame, wherein a first expandable member is disposed between a lower surface of the upper door and an upper surface of the lower door in a state in which the upper door and the lower door are closed, wherein a second expandable member is disposed between the upper door and the frame and between the lower door and the frame in a state in which the upper door and the lower door are closed, wherein the second expandable member is attached to the front surface of the frame and surrounds the opening along a perimeter, wherein the upper door and the lower door constitute a complementary vertical and horizontal directional movement door assembly in which a first drive unit is provided for moving the upper door in a linear vertical direction between an upper open position and an upper closed position, and a second drive unit is provided for moving the lower door from a horizontal direction to a vertical direction by rotating the lower door about a first end portion adjacent to the frame, the first end portion being vertically moved by the second drive unit during the rotation, and a second end portion of the lower door is horizontally guided toward the frame between a lower open position and a lower closed position.

2. The fireproof shutter of claim 1, further comprising a first guide unit for constraining the upper door along a linear vertical path between the upper open position and the upper closed position.

3. The fireproof shutter of claim 1, wherein the second drive unit comprises a motor mounted on the frame, a ball screw connected to a rotating shaft of the motor and extending in the vertical direction, and a ball nut engaged with the ball screw and connected to the first end portion of the lower door.

4. The fireproof shutter of claim 1, further comprising a second guide unit for guiding the second end portion of the lower door in the horizontal direction.

5. The fireproof shutter of claim 4, wherein the second guide unit comprises a roller mounted on a side surface of the second end portion of the lower door and a guide member having a channel extending in the horizontal direction, and the roller is disposed within the channel.

6. The fireproof shutter of claim 1, wherein a lower surface of the upper door and an upper surface of the lower door have grooves into which the transport rail is inserted in a state in which the upper door and the lower door are closed.

7. The fireproof shutter of claim 1, wherein a first sealing member is disposed between a lower surface of the upper door and an upper surface of the lower door in a state in which the upper door and the lower door are closed.

8. The fireproof shutter of claim 7, wherein a second sealing member is disposed between the upper door and the frame and between the lower door and the frame in a state in which the upper door and the lower door are closed.

9. The fireproof shutter of claim 1, wherein the first expandable member is expanded by heat when a fire occurs to block a gap between the upper door and the lower door.

10. The fireproof shutter of claim 9, wherein the second expandable member is expanded by heat when a fire occurs to block a gap between the upper door and the frame and a gap between the lower door and the frame.

* * * * *